No. 669,970.  
Patented Mar. 12, 1901.
H. GOLDMAN.
CALCULATING MACHINE.
(Application filed Aug. 8, 1898.)
(No Model.)  
4 Sheets—Sheet 1.
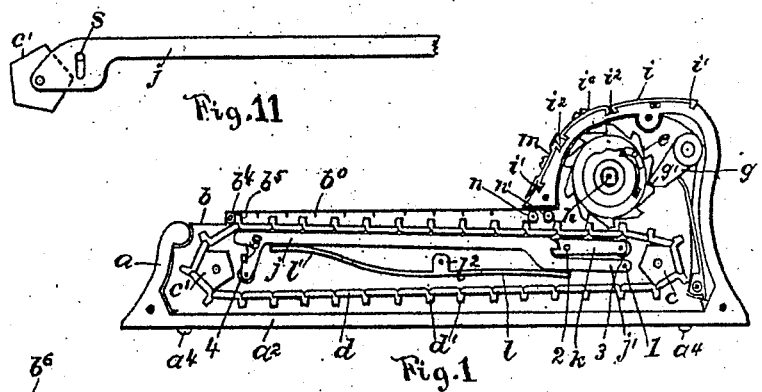
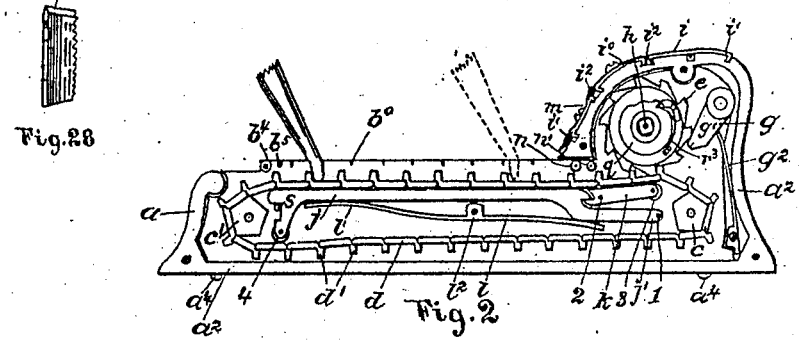
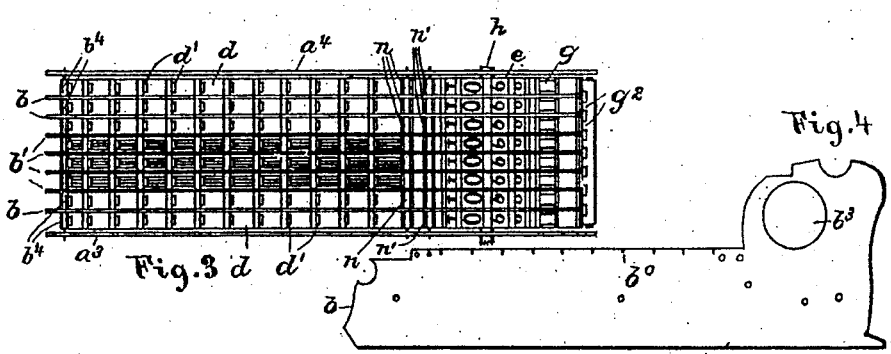
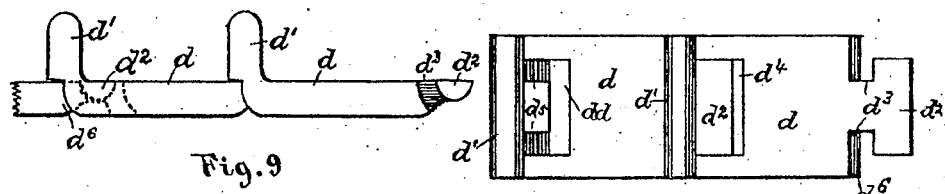
Witnesses:  
Wm Nelson  
C. C. Clark
Inventor  
Henry Goldman  
By Wm Zimmerman  
Atty.

No. 669,970. Patented Mar. 12, 1901.
H. GOLDMAN.
CALCULATING MACHINE.
(Application filed Aug. 8, 1898.)
(No Model.) 4 Sheets—Sheet 2.
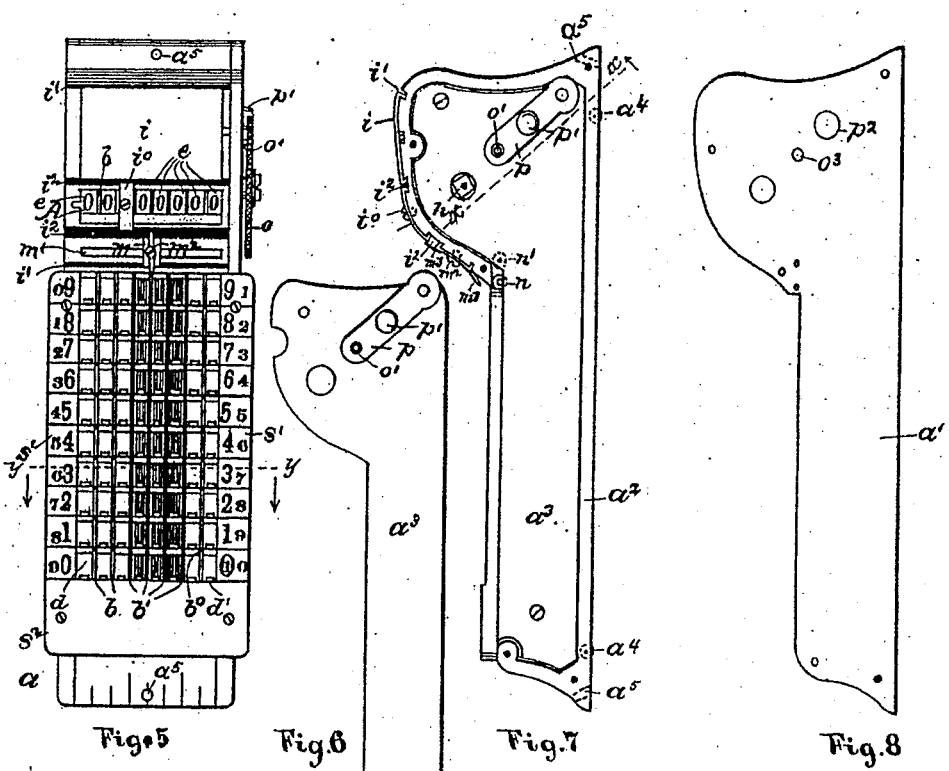
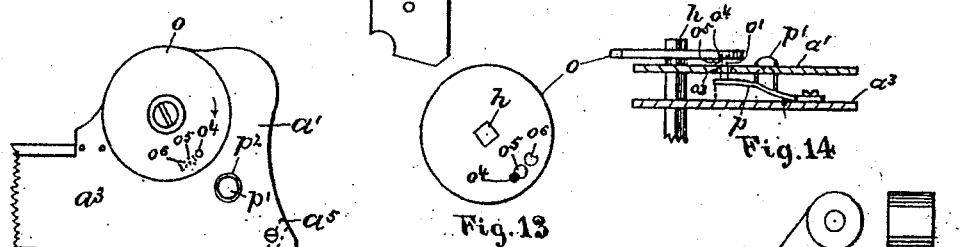
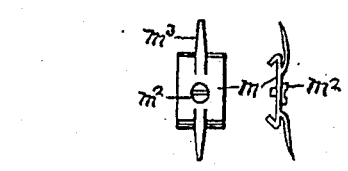
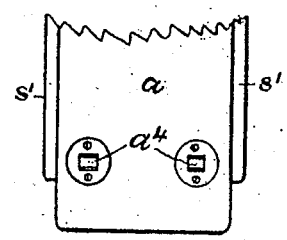
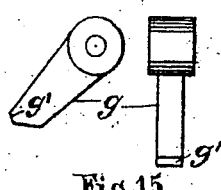
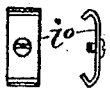
Witnesses:
Wm Nelton
C. C. Clark
Inventor
Henry Goldman
By Wm Zimmerman
Atty No. 669,970. Patented Mar. 12, 1901.
H. GOLDMAN.
CALCULATING MACHINE.
(Application filed Aug. 8, 1898.)
(No Model.) 4 Sheets—Sheet 3.
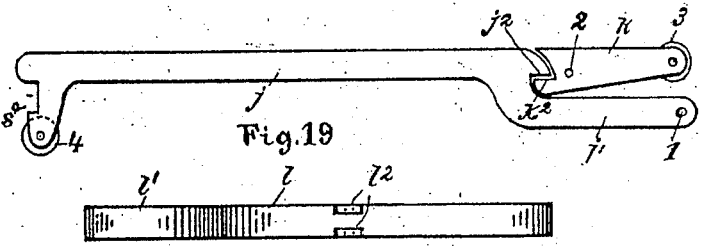
Fig. 19
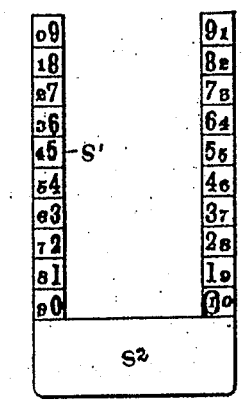
Fig. 20
Fig. 21
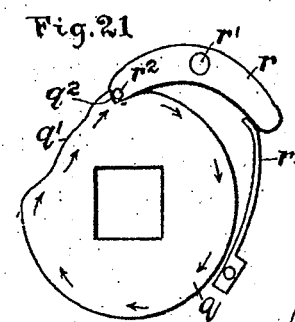
Fig. 22
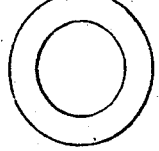
Fig. 26
Fig. 25
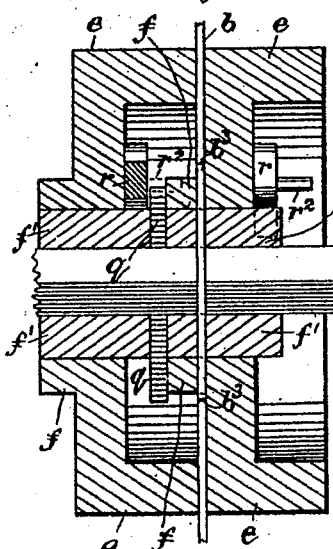
Fig. 23
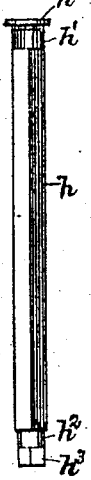
Fig. 27
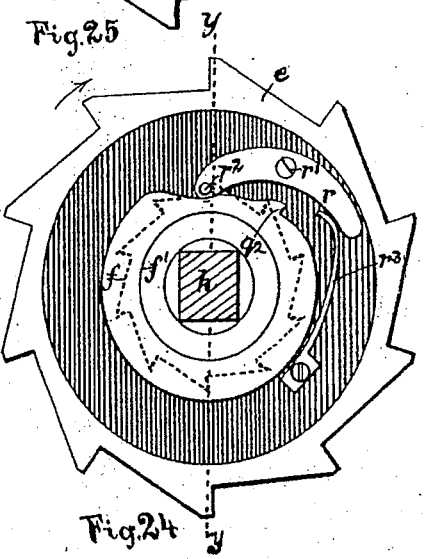
Fig. 24
Witnesses:
Wm Nelson
C. C. Clark
Inventor
Henry Goldman.
By Wm Zimmerman,
Atty.

No. 669,970. Patented Mar. 12, 1901.
H. GOLDMAN.
CALCULATING MACHINE.
(Application filed Aug. 6, 1898.)
(No Model.) 4 Sheets—Sheet 4.

Witnesses:
Wm Nelson
C. C. Clark

Inventor
Henry Goldman.
By W. Zimmerman,
Atty

UNITED STATES PATENT OFFICE.

HENRY GOLDMAN, OF CHICAGO, ILLINOIS, ASSIGNOR TO THE INTERNATIONAL ARITHMACHINE CO., OF ILLINOIS.

CALCULATING-MACHINE.

SPECIFICATION forming part of Letters Patent No. 669,970, dated March 12, 1901.

Application filed August 8, 1898. Serial No. 688,089. (No model.)

*To all whom it may concern:*

Be it known that I, HENRY GOLDMAN, a citizen of the United States, residing at Chicago, in the county of Cook and State of Illinois, have invented certain new and useful Improvements in Calculating-Machines, which are fully set forth in the following specification, reference being had to the accompanying drawings, forming a part hereof, and in which—

Figure 31:
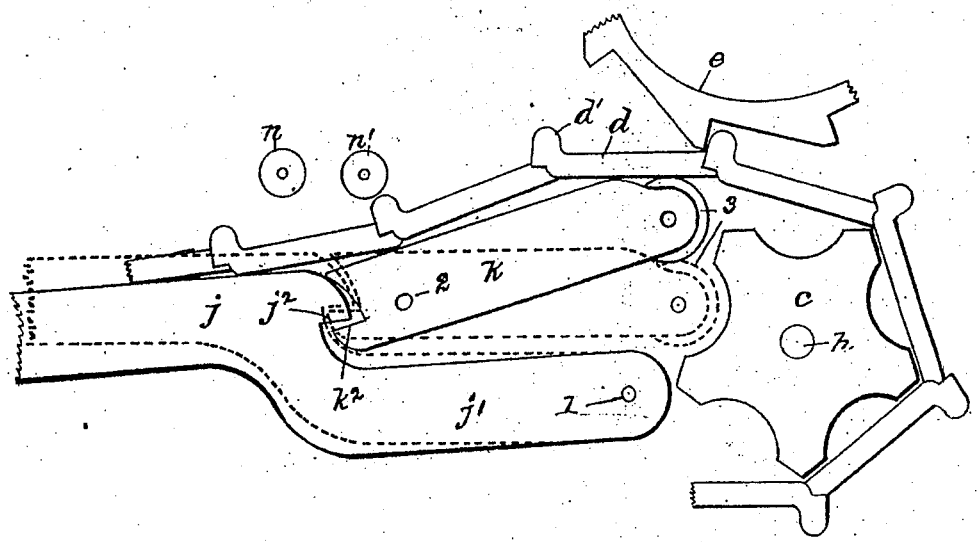
Figure 30:
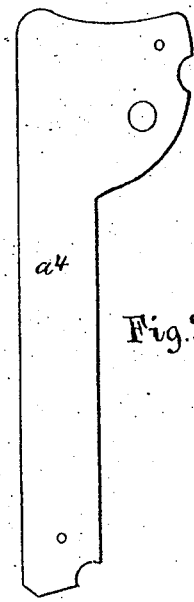
Figure 29:
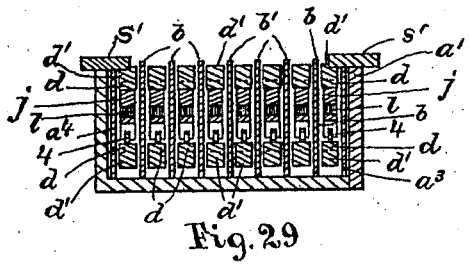

Figure 1 shows my machine in side elevation, having the side wall of the casing and frame-plate removed to show the interior construction in position for action. Fig. 2 shows the machine in action. Fig. 3 shows in plan view the mechanism removed from its case. Fig. 4 shows in side elevation a septum or partition which separates the chains, &c. Fig. 5 shows a complete machine in plan view. Fig. 6 shows the right-hand frame-plate and its release-spring. Fig. 7 shows Fig. 6 in place in the side of the case. Fig. 8 shows the side wall of the casing. Fig. 9 shows two links of an endless chain in side elevation. Fig. 10 shows Fig. 9 in plan view. Fig. 11 shows a modified construction of the platform-lever and its pentagonal drum. Fig. 12 shows, in side elevation, a fragment of the side of the case with its setting or return wheel. Fig. 13 shows the return-wheel of Fig. 12 reversed. Fig. 14 shows a fragment of the registering-drum shaft and its resetting-wheel and the mechanism immediately connected with it for its operation on plane $xx$, Fig. 7, when looking toward the rear of the machine. Fig. 15 shows the registering-drum stop-pawl in side and front view. Fig. 16 shows a part of one end of the case on its bottom side. Fig. 17 shows an adjustable decimal point in plan and side view. Fig. 18 shows an adjustable shutter in plan and side view. Fig. 19 shows the chain-carrying or platform lever and chain-lifting or contact lever in side elevation. Fig. 20 shows in plan view a spring for operating the platform-levers of Fig. 19. Fig. 21 shows in plan view two double-numeraled and operatively-related side tablets. Fig. 22 shows, on an enlarged scale, a return-cam of the registering-drum shaft and spring and lever connected with it in operation. Fig. 23 shows a central longitudinal section of two connected registering drums or wheels and their within operatively-connected parts. Fig. 24 shows in end elevation a registering-drum and its internal construction. Fig. 25 shows the reversed or opposite side of Fig. 24. Fig. 26 shows in end view a collar for carrying the registering-drums on their shaft. Fig. 27 shows the shaft of the registering-drums. Fig. 28 shows in perspective a fragment of an end of a partition $b$ with a sharp top edge. Fig. 29 shows a tranverse vertical section of Fig. 5 on the plane $yy$ of Fig. 5. Fig. 30 shows the left-hand frame-plate. Fig. 31 shows, on an enlarged scale and of modified construction, fragments of a registering-drum, chain, platform-lever, guiding-rollers $n n$, and lever $k$.

Like characters of reference denote like parts in all the figures.

The object of my invention is to improve the construction of my calculating-machines pending applications, respectively, January 25, 1897, Serial No. 620,630, and September 9, 1897, Serial No. 651,063.

Said improvements consist in the new construction and arrangements of the several parts, substantially as shown in the drawings and hereinafter set forth in regard thereto. To attain said desired ends, I construct and arrange the said several parts of my new machine substantially as follows, namely:

I make a case $a^2$, in which the bottom, both ends, one side, and cover over the notation-wheels all together form one piece. The right-hand side $a'$ of said case is removable to inclose the connected interior mechanism, such as is shown in Fig. 3. The bottom of the case has four rollers $a^4$ parallel to the longitudinal sides of the case, near its corners, to give the machine an easy motion over the pages of ledgers, &c., and to at the same time serve as a ruler with which a line ruled on the side of the machine may be prolonged indefinitely. The case is divided into a series of longitudinal vertical cells by septums $b$, which rise above the chain mechanism, which they separate, and also pass between and above the notation-wheels, which they also separate, but provide for connecting mechanism between them through openings $b^8$, axially coincident with the shaft of said notation-wheels. In each of said cells is an endless chain $d$ on pentagonal rollers or drums $c\ c'$, the practicable limit of construction and use of the chain-links and drums being such as to make the conditions most suitable for a pentagonal drum. Said pentagonal drums turn on a rod which passes through the entire series of cells; but the series of drums $c'$ may also be held each on the free end of the platform-lever $j$ by an axis kept within its own cell, constructed as indicated in Fig. 11, where the long pin $s$ limits the vibration of the lever and its drum by a vertical slot instead of having the drum fixed, as shown in Figs. 1 and 2, and where there is a notch $s^0$ in a leg 5 of the lever $j$ to limit the amount of vibration of said lever. The fulcrum of said lever is at $l$ about directly under the drum-shaft $h$ in the arm $j'$ of the lever. At the free end of the arm $j'$, forming an integral part of the lever $j$, there is a rounded and interiorly-notched shoulder $j^2$, which engages with a spur $k^2$ of a short lever $k$, fulcrumed at 2, near the shoulder, and of which the upper edge is in a line with the top line of the lever $j$. There is an antifriction-roller 3 in the free end of the lever $k$ and a like roller 4 in the lower end of the leg at the free end of the lever $j$, whereof its outer edge has a notch $s^0$, in which the rod $s$ is held and whereby the range of vibration of the levers $j\ k$ is controlled. A long flat spring $l$, centrally held by lugs $l^2$, presses with one of its free ends upon the said shoulder of the arm $j'$, and with its end $l'$ it presses against the free end of the lever $j$. The pin or rod which passes through said lugs and holds all the springs is a single piece which passes through all the cells of the machine.

The chain-links $d$ have vertical spurs $d'$ at the end of each link, which afford a good hold for operating by means of a stylus or pencil, as indicated in Fig. 2, where the end of the stylus at its starting-point is indicated in broken outlines and in full lines at the end of its stroke, it being arrested by the rod $b^5$ and above the rear drum C, and somewhat farther toward the front are peripherally-toothed registering-wheels or registering-drums $e$, one between each two adjacent septums and for each chain, so placed as to be free from said chain-spurs, yet so arranged relatively that the chain-spurs will make unfailing contact with the teeth of the registering-wheels whenever the chains are properly worked with the stylus. The enlarged drawing, Fig. 31, clearly shows the nature of the operation of said mechanism. When the lever $j$ is depressed, the lever $k$ rises and contacts the spurs $d'$ with the spurs of the wheels or drums $e$, and whenever said lever is released the action of the spring $l$ immediately releases said spurs, and, as shown in the construction in Fig. 31, stops the action of the chain, because the roller 3 falls into one of the shoulders, or, as here shown, concave notches of the drum $c$, and thus checks further motion. Said action will always occur because of the measured relation of the several parts and is governed by the stylus and its stop $b^5$, which is a rod extending across the entire mechanism at the end of the limit of the travel of the stylus. Immediately after the stop $b^5$ is a rod with rollers $b^4$, lower than the rod $b^5$, under which the spurs $d'$ pass and strike against said rollers when raised thereto by the lever $j$, but aiding the action of said chain by their rolling motion whenever the chain is again brought into play, and said last action is further facilitated by the roller 4, which depresses the chain under it, and thus drags on the chain part which runs over the roller $c'$ and so brings down the chain at the roller $b^4$ by forcing any kink it may have out of it, and by said arrangement of mechanism the chain is worked suitably at each of its ends.

The registering-drums are chambered on one side only, and from the axial opening outward to near the periphery, while the opposite face is left a plain surface from the periphery to the ratchet-toothed pinion $f$, around the axial opening on that side, and in the said drum-chamber is a crescent-shaped lever $r$, pivoted at $r'$ to the registering-wheel and acted upon by a spring $r^3$ at its outer end, which contacts the side spur $r^2$ with the periphery of a cam $q$, non-rotatably mounted on the drum-shaft $h$. The said cam has two peripheral faces, one a circular part, to which the wavy surface $q'$ is connected at each end, and at one end of said circular face is a notch $q^2$. The pin $r^2$ on the inner or cam-contact end of the lever $r$ rests and slides on the faces of said cam and moves toward and from the axis of the shaft $h$ through the action on it of the said two faces of the cam. The pin $r^2$ reaches across said cam and into the notches $f^2$ of the pinion $f$ and is engaged with or released therefrom by the rotation of said cam. The wheels $e$ turn on sleeves $f'$, which are held on the angular edges of the shaft $h$, or they revolve with said sleeves on the shaft $h$. The length of said sleeves is limited by the cams $q$, between which they each hold a wheel $e$, and they pass through the holes $b^3$ of the septums $b$. Each wheel $e$ has ten teeth, and radially coincident with said teeth are teeth $f^2$ on a thereto-fixed pinion $f$, which are engaged by the pin or spur $r^2$, and said spurs are released from said teeth by the action of the cam $q$. Said teeth $f^2$ are concaved on their working faces to afford a better holding-surface against slipping. The motion of said parts $q\ e$ is in the direction indicated by the arrows, and when the tenth cog of the wheel $e$ is connected with the chain and completes the last part of its revolution the face $q'$ lets the stud $r^2$ into a notch $f^2$ of the notationally next higher wheel and moves it the space of one tooth, and so on for the entire series of wheels $e$. When all the wheels $e$ are to be set to zero, the shaft $h$ is turned in the direction indicated by the arrows in Fig. 22, thereby causing the notches $q^2$ to catch the pins $r^2$, respectively, wherever in the circle each may be relatively to the notches $q^2$, which are all in a line parallel with the shaft $h$ and so arranged with the zero-face of the wheel $e$ that by a single revolution of said shaft all the wheels $e$ bring their zero-marked faces to the register-opening A.

The shaft $h$ has journal-bearings $h'$ $h^2$ at its ends, and a flat screw-head $h^4$ holds the left-hand end thereof on the outside of the wall $a^4$, in which the journal $h'$ turns. Beyond the journal $h^2$ is a squared part $h^3$, which enters a square hole in the resetting-wheel $o$, Figs. 12 and 13, and on the inner side of said resetting-wheel are two spurs $o^5 o^6$, which contact with a stud $o^4$, which comes through the hole $o^3$ from the free end of a spring $p$, secured to the side plate $a^3$, whereon is a push-post $p'$, whereby the pin $o'$ may be depressed to release the parts $o^6$ $o^7$ of the wheel $o$ from the spur, and by turning said wheel the shaft $h$ and its cams $q$ are turned, effecting thereby the resetting of the wheels $e$, as already set forth. A pawl $g$, actuated by a spring $g^2$, has its point thrown against the wheel $e$ to prevent any backward motion of the mechanism. To facilitate the perfect action of said pawl, its end is beveled at its point $g'$, so as to slip to place and force the wheel $e$ to recede if it has advanced too far through the momentum imparted to it.

The chain here used has links $d$, with a cross-head $d^2$ on a neck $d^3$ at one end and a spur $d'$, raised at right angles to the face of the link, at its other end, and in front of said spur are concaved faces $d^5$, which hold the ends of the cross-head, and in front of said concaved notches is a slot $d$ $d$, through which the said head is passed when at right angles to the receiving-link, from which it is passed back against the spur $d'$, and then the link is extended so that the half-round cross-head ends $d^2$ fit into the said correspondingly-rounded cavities $d^5$. Said chain is rigid and free from sag against pressure upon the spur-face side; but each link will work with its fellow to about a right-angle position toward the opposite side and is inseparable when in its place. According to the said arrangement all the spurs $d'$ are to be in line across the machine, as seen in Figs. 3 and 5, and to form a check for said desired condition. The septums $b$ are provided with nicks $b^0$ in line with said spurs. To divide the entire group of chains into sets for various purposes, said septums are made thicker, as shown at $b'$, Fig. 3, and may be milled or polished or cut into peaked edges, as shown in Fig. 28, and the chains themselves may be changed so as to show different colors or markings, as shown between the septums $b'$, the arrangement, as shown in Fig. 3, being adapted to the computation of dollars and cents. A set of two rollers $n$ $n'$ also tends to bring the chain into correct longitudinal position by their action. When the chain is raised by the lever $j$, the spurs will be, approximately, near their place to which they will be corrected, as the upward motion of the spurs will rotate the rollers, and thus push the chain in either direction, the roller $n'$ acting as shown in Fig. 31, as the chain has gone too far. The roller $n$ would act if the chain had not gone far enough, the said rollers being so placed as to be between the spurs about as shown.

The hood which covers the notation-wheels has at its top an aluminium plate $i$ to be used as a tablet for memoranda, held by incurved hooks $i'$ in transverse channels $i^2$, into which the hooks $i$ have a longitudinal sliding fit. The intermediate channels $i^2$ are of double width to receive two adjoining hooks $i'$, and below the plate $i$ is an adjustable shutter $i^0$, held by hooks $i'$ in said transverse grooves, used for shutting out from view any numbers which it may be necessary to exclude from the register-opening, and still further below is an adjustable decimal point $m^3$ on a body $m$ with said hooks $i'$ to play in said grooves $i^2$, and in its body is a screw-stud $m^2$, which plays in a groove with closed ends, whereby it is secured to the machine. There is a like construction for the shutter $i^0$ to secure it to its place, as shown. At the front end of the case is a scale, and in the center of each end edge is a hole $a^5$, through which pins may pass to fasten the machine to a board or otherwise secure it and by means of which it may be hung on a nail. On each side of the machine, on the walls of the case, are tablets $s'$, connected to an end tablet $s^3$. On said tablets are double rows of numbers, whereof the outer rows are smaller than the inner rows.

What I claim is—

1. The combination with a toothed numbering-wheel, of a spurred drum-supported tangentially-moving chain to said wheel, a notched platform-lever and stop in said notch and means connected to said lever, provided with antifriction-rollers, to engage and disengage said chain and numbering-wheel, substantially as specified.

2. The combination with a toothed registering-wheel, of a chain-link provided with a spur, vertical to its face, and a slot in the link-body with bearings in its sides and a cross-head with neck at the other end of the link, substantially as specified.

3. The combination with toothed registering-wheels provided with centrally-pivoted levers with lateral spurs and springs to said levers and shafts non-rotatable with said wheels, of sleeves on said shafts, carrying said wheels, and septums to said wheels with openings for said shaft, substantially as specified.

4. The combination with chain-drums carrying endless chains, of a pivoted reciprocable platform-lever provided with a foot at the free end of said lever to engage the opposite chain side, substantially as specified.

5. The combination with a platform-lever and thereto-connected and thereby-operated oppositely-moving lever, of a chain carried and operated by said levers and a drum to carry said chain and means whereby said latter lever releases and stops said drum, substantially as specified.

6. The combination with septums provided with openings $b^3$, registering-wheels and a shaft therefor, and means to operatively connect adjacent registering-wheels, of cams between said wheels and sleeves to carry said wheels and to hold said cams between them, substantially as specified.

7. The combination with toothed registering-wheels and spurred and tangentially-acting chains thereto, of rollers and means to actuate said chains beyond their normal line and into contact with said rollers to bring the chains to a normal position of rest, substantially as specified.

8. The combination with toothed registering-wheels and spurred and tangentially-acting chains thereto, of bevel-ended and spring-actuated pawls to return said wheels back to a normal position of rest, substantially as specified.

9. The combination with a grooved case and notation-wheels therein, and means for notational registration, of tablets with incurved hooks held, removably, in said grooves, substantially as specified.

10. The combination with a registering mechanism and a thereto register-opening having undercut grooves, of a sliding shutter to said opening with claws extending into said grooves, substantially as specified.

HENRY GOLDMAN.

Witnesses:
WM. ZIMMERMAN,
P. H. HOLLAND.